United States Patent [19]

Erb

[11] Patent Number: 5,775,364

[45] Date of Patent: Jul. 7, 1998

[54] CONNECTOR FOR GUARANTEE TAP

[75] Inventor: René Erb, Phalsbourg, France

[73] Assignee: Vitop, Phalsbourg, France

[21] Appl. No.: 759,706

[22] Filed: Dec. 6, 1996

[30] Foreign Application Priority Data

Dec. 7, 1995 [FR] France .................. 95 14814

[51] Int. Cl.$^6$ .................. F16L 37/30; F16L 37/36
[52] U.S. Cl. .................. 137/322; 137/614.11; 222/506; 251/252; 251/321
[58] Field of Search .................. 137/322, 315, 137/614.11; 251/149.5, 149.6, 321, 322, 323, 148, 252; 222/400.7, 505, 506, 544

[56] References Cited

U.S. PATENT DOCUMENTS

| 2,131,271 | 9/1938 | Coles et al. ............ 251/149.5 |
| 2,134,382 | 10/1938 | Thompson ............ 251/149.5 |
| 2,598,009 | 5/1952 | Peeps ............ 251/149.5 |
| 2,692,151 | 10/1954 | Melato ............ 251/149.9 |
| 2,765,806 | 10/1956 | Webster ............ 137/322 |
| 2,829,907 | 4/1958 | Gill ............ 251/149.5 |
| 2,888,276 | 5/1959 | Wei ............ 251/149.5 |
| 2,889,849 | 6/1959 | Shohan ............ 137/322 |
| 2,898,128 | 8/1959 | Shohan ............ 137/322 |
| 2,945,703 | 7/1960 | Ballard ............ 251/149.5 |
| 3,199,831 | 8/1965 | Sully ............ 251/149.6 |
| 3,507,299 | 4/1970 | Murdock ............ 137/322 |
| 4,069,686 | 1/1978 | Hoelman ............ 137/322 |
| 4,159,102 | 6/1979 | Fallon et al. ............ 137/322 |
| 4,331,175 | 5/1982 | Brake et al. ............ 137/322 |
| 4,384,591 | 5/1983 | Tan ............ 137/322 |
| 4,538,746 | 9/1985 | Hines ............ 137/322 |
| 4,736,926 | 4/1988 | Fallon et al. ............ 137/322 |
| 4,844,123 | 7/1989 | Wick ............ 137/322 |
| 5,636,656 | 6/1997 | Hubbard ............ 137/322 |

FOREIGN PATENT DOCUMENTS

| 0 432 070 | 6/1991 | European Pat. Off. . |
| 1355712 | 12/1964 | France ............ 137/322 |
| 1 475 669 | 2/1969 | Germany . |
| 455222 | 4/1975 | U.S.S.R. ............ 251/149.5 |

Primary Examiner—George L. Walton
Attorney, Agent, or Firm—Young & Thompson

[57] ABSTRACT

A connector for a guarantee tap (1) provided with a pull piston (2), is actuated by appendages (3) secured to the piston (2). A body (4) mounts the tap (1), and a device (5) for sealed connection of the outlet end of the tap (1) is provided. A device (6) holds the tap (1) and actuates the dispensing piston (2). There is a coupler (7) to a dispensing conduit. The connector is more particularly applicable to the field of distribution of liquids, particularly comestible liquids.

5 Claims, 2 Drawing Sheets 5,775,364

CONNECTOR FOR GUARANTEE TAP

BACKGROUND OF THE INVENTION

This application is based on application No. 95 14814 filed in France, the content of which is incorporated hereinto by reference.

1. Field of the Invention

The present invention relates to the field of dispensing of liquids contained in small rigid, semi-rigid or flexible containers, particularly consumable alcoholic liquids subject to tax, these receptacles being provided, for this purpose, with guarantee taps, and has for its object a connector for a guarantee tap.

2. Description of Related Art

At present, the dispensing of consumable beverages, particularly table wines, from small rigid, semi-rigid or flexible receptacles, such as bags of synthetic material, generally takes place by means of taps fixed on the outlet plug of these receptacles.

To this end, there is known more particularly from EP-A-0 432 070, a tap constituted by a body for mounting in the plug of a receptacle and by a piston for dispensing liquid, loaded by a spring and guided in the body, the piston acting on a resilient sealing membrane secured to the body. The mounting body in the plug is provided with a securement sleeve comprising a throat coacting by snapping in with an annular projection of the plug, thereby preventing any dismounting of the tap.

For its handling, the piston is provided, at its upper portion, with appendages, extending outside the tap through openings in this latter and adapted to permit exerting traction on the piston, so as to free the dispensing opening.

The guarantee of this tap permits avoiding any fraud, by preventing refilling, because of the impossibility of demounting the tap from the plug of the receptacle.

Such taps permit correct dispensing of the liquid and are perfectly adapted either to a bottling operation or to a succession of withdrawals, for example for filling glasses or small receptacles, which is to say for private use or public use for small flows of a single beverage or of a single wine.

However, in the case of large flows in public establishments or of the dispensing of different wines by the glass, several receptacles are used simultaneously and their size requires their installation in an independent space and their connection by suitable means to a bank of dispensers with multiple taps.

To this end, it is necessary to have a connection device between the distributor and the tap of the receptacle, this device permitting sealed and rapid connection of the outlet of the tap of the receptacle to a supply conduit and a maintenance of this tap in dispensing position during all the duration of the connection.

The present invention has for its object to provide a connector for a guarantee tap, of the pulled piston type according to EP-A-0 432 070, permitting ensuring such connection.

SUMMARY OF THE INVENTION

According to the invention, the connector is essentially constituted by a mounting body for the tap, by a sealed connection device for the outlet end of the tap, by means for holding the tap and for actuating the dispensing piston and by a coupling to a dispensing conduit.

BRIEF DESCRIPTION OF THE DRAWINGS

The invention will be better understood from the following description, which relates to a preferred embodiment, given by way of non-limiting example, explained with reference to the accompanying schematic drawings, in which.

DETAILED DESCRIPTION OF THE INVENTION

Figure 1:
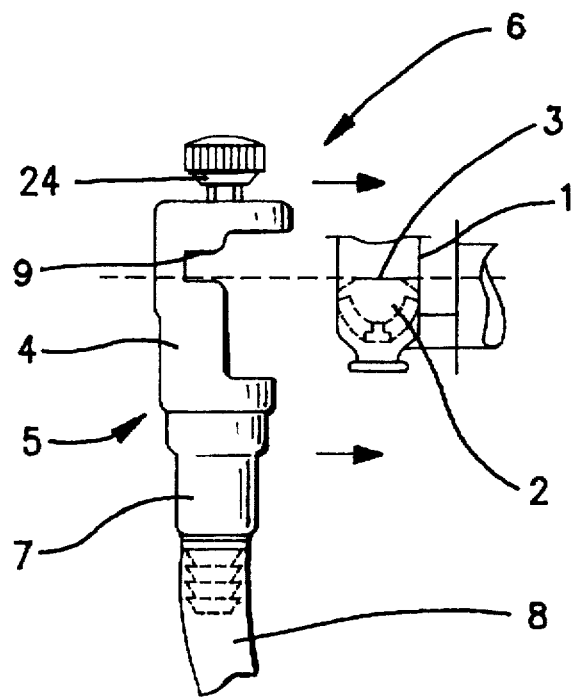
FIG. 1 is a side elevational view of the connector according to the invention before emplacing on a guarantee tap.
Figure 2:
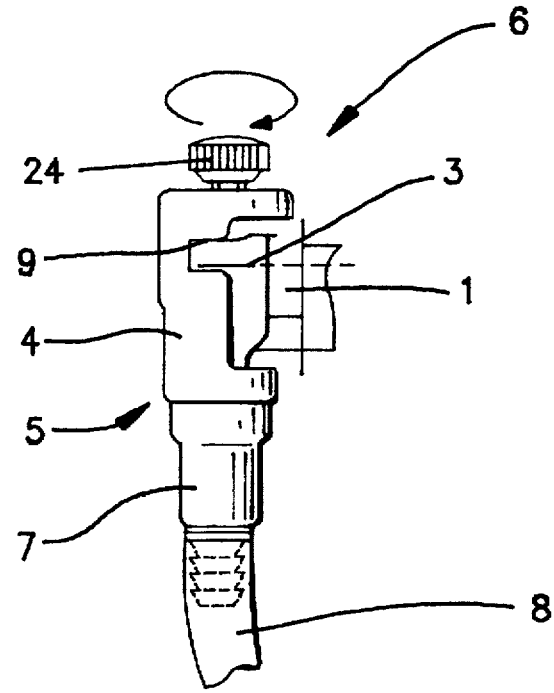
FIG. 2 is a view analogous to that of FIG. 1 showing the connector in service position, and, FIG. 3 is a view on a larger scale, in side elevation and cross section, of the connector.
Figure 3:
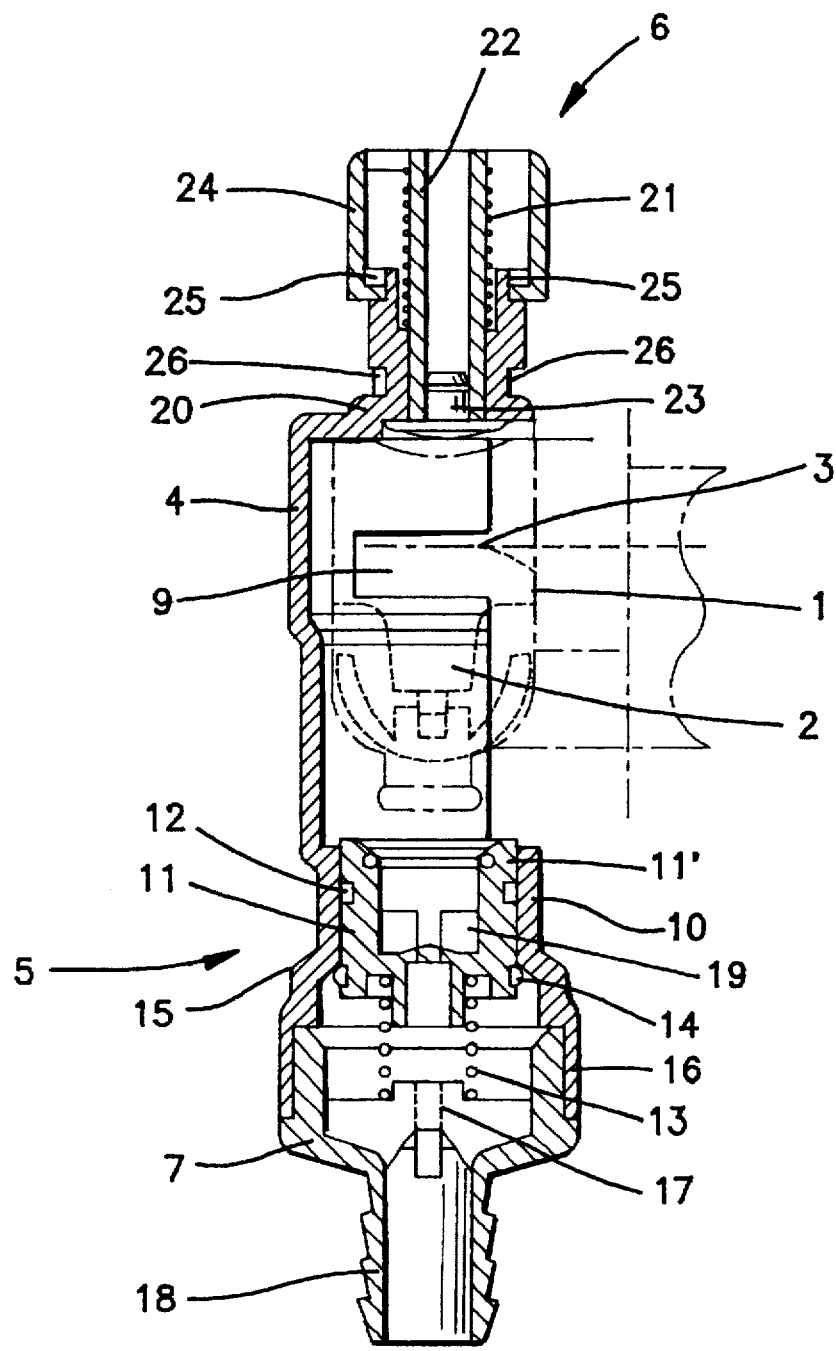

According to the invention, and as shown in FIGS. 1–3 of the accompanying drawings, the connector for a guarantee tap 1 provided with a dispensing piston 2, actuated by the intermediate appendages 3 secured to the piston 2, is essentially constituted by a body 4 for mounting of the tap 1, by a device 5 for sealed connection of the outlet end of the tap 1, by means 6 for holding the tap 1 and for actuating the dispensing piston 2, and by a coupling 7 to a dispensing conduit 8.

As shown more particularly in FIG. 3 of the accompanying drawings, the mounting body 4 for the tap 1 is in the form of a semi-cylindrical element for receiving the body of the tap 1 and is provided on a level with appendages 3 for actuating the piston 2 of the tap 1, with cutouts 9 for receiving said appendages 3 with the possibility of displacement of these latter, said body 4 being closed at its upper portion by means 6 for holding the tap 1 and at its lower portion by the device 5 for sealed connection of the outlet end of the tap 1.

The sealed connection device 5 for the outlet end of the tap 1 is constituted by a sleeve 10 prolonging the lower portion of the body 4 of the connector and receiving a valve 11, mounted with the possibility of sealed sliding by means of a joint 12 in said sleeve 10 and provided with a joint 11' pressed by the liquid outlet end of the tap 1, said valve 11 being urged in its closing direction by a joint 14 engaging below a shoulder 15 prolonging the sleeve 10 on the side opposite the body 4.

The connection coupling 7 to a dispensing conduit 8 is secured by screwing in the cylindrical portion 16 prolonging the shoulder 15 of the lower portion of the sleeve 10 and is of greater diameter than this sleeve 10, and comprises a bearing against which bears the return spring 13 acting on the valve 11, the free portion of the coupling 7 comprising a grooved tube 18 for securement of the conduit 8.

The bearing 17 is, in a known manner, in the form of a central bearing element connected to the internal edge of the coupling 7 by radial elements, so as to permit passage of the liquid.

The valve 11 is in the form of a hollow piston provided, near its end opposite the bearing surface against the end of the liquid outlet of the tap 1, lateral openings 19. Thus, by displacement of the valve 11 against the action of the return spring 13, the lateral openings 19 are freed and liquid issuing from the tap 1 can flow into the chamber delimited below the sleeve 10 in the direction of the coupling 7 and through this latter into the conduit 8 for its dispensing.

The holding means 6 for the tap 1 and for actuation of the dispensing piston 2 are in the form of a bearing 20 forming the upper portion of the body 4, in which is displaceably mounted, against the action of the return spring 21, a piston 22 provided with a member 23 bearing on the top of the body of the tap 1, said piston 22 being actuated in displacement by means of a hollow button 24 or the like secured to the upper end of the piston 2 and coacting, by means of at least one lug 25, with a spiral cam 26 provided on the bearing 20.

By rotation of the plug 24 or the like, there takes place a displacement of the piston 22 with its bearing member 23 against the action of the return spring 21, by displacement of the lug or lugs 25 in the corresponding spiral cam or cams 26. This displacement has for its effect to apply the member 23 against the top of the tap body 1 and, because of this, to displace said body in the direction of the device 5 for sealed connection of the outlet end of the tap 1. As a result, there is an application of said end against the joint 11' of the valve 11.

Upon continued rotation of the plug 24, the valve 11 is displaced to its position clearing the lateral openings 19 and, simultaneously, the appendages 13 for actuating the piston 2 are applied against the corresponding surfaces of the cutouts 9 of the body 4 for mounting the tap 1, such that the piston 2 is subjected to a traction having for its effect freeing the passage of liquid.

FIG. 1 of the accompanying drawings shows the connector according to the invention before emplacement on a guarantee tap. To this end, the plug 24 must be displaced to its upper position for withdrawing piston 22 and the bearing member 23, such as shown in FIG. 3 of the accompanying drawings. The body 4 of the connector can then be engaged on the body of the tap 1, then the plug 24 is actuated so as to bring the assembly into connected position, such as shown in FIG. 2 of the accompanying drawings.

By dismounting the connector, the valve 11 closes automatically, simultaneously with the closing of the piston 2, which follows from the unscrewing of the plug 24 and the action of the return spring 13 on the valve 11. This unscrewing of the plug 24 also has the result of relaxing the traction on the appendages 3 of the piston 2 and, because of this, effecting closure of the latter.

Thanks to the invention, it is possible to provide a connector for a guarantee tap, of the drawn piston type, permitting rapid and effective connection to a supply conduit of a distributor.

Of course, the invention is not limited to the embodiment described and shown in the accompanying drawings. Modifications remain possible, particularly as to the constitution of various elements or by substitution of technical equivalents, without thereby departing from the scope of protection of the invention.

What is claimed is:

1. A connector for a guarantee tap (1) provided with a dispensing piston (2) actuated by appendages (3) secured to said dispensing piston for controlling flow therethrough (2), the connector comprising a body (4) for mounting the tap (1), a device (5) for sealed connection of an outlet end of the tap (1), means (6) for holding the tap (1) including means for actuating the dispensing piston (2), and a coupling (7) to a dispensing conduit (8), said body (4) for mounting the tap (1) being a semi-cylindrical element for receiving the tap (1) and being provided at the appendages (3) for actuating the piston (2) of the tap (1) with cutouts (9) for receiving said appendages (3) with clearance for the displacement of said appendages when the actuating means moves the actuating piston (2), said body (4) being closed at its upper portion by said means (6) for holding the tap (1) and at its lower portion by said device (5) for a sealed connection of the outlet end of the tap (1).

2. The connector according to claim 1, wherein the device (5) for the sealed connection of the outlet end of the tap (1) is a sleeve (10) prolonging a lower portion of the body (4) of the connector and receiving a valve (11) mounted for sealed sliding by means of a joint (12) in said sleeve (10) and provided with a joint (11') for bearing against the outlet end of the tap (1), said valve (11) being urged in a closing direction by a return spring (13) and being maintained in a closed position by a joint (14) bearing on the underside of a shoulder (15) prolonging the sleeve (10) on the side opposite the sleeve (10) of the body (4).

3. The connector according to claim 2, wherein said coupling (7) to said dispensing conduit (8) is fixed by screwing in a cylindrical portion (16) prolonging said shoulder (15) on the lower part of the sleeve (10) and of larger diameter than said sleeve (10), and comprises a bearing (17) against which presses the return spring (13) acting on the valve (11), a free portion of the coupling (7) being in the form of a grooved tube (18) for the securement of the conduit (8).

4. The connector according to claim 2, wherein the valve (11) is in the form of a hollow piston provided, adjacent its bottom opposite the bearing surface against the outlet end of the tap (1), with lateral openings (19).

5. The connector according to claim 1, wherein said means for actuating the dispensing piston (2) to comprise a bearing (20) closing an upper portion of the body (4), in which is displaceably mounted, against the action of a return spring (21), a piston (22) provided with a member (23) bearing on an upper side of the body of the tap (1), said piston (22) being actuated displaceably by means of a hollow plug (24) secured to an upper end of the piston (22) and coacting by means of at least one lug (25) with a spiral cam (26) provided on said bearing (20).

\* \* \* \* \*